(12) United States Patent
Zeyfang

(10) Patent No.: US 8,443,844 B2
(45) Date of Patent: May 21, 2013

(54) FLANGE PROTECTOR

(75) Inventor: Frederick W. Zeyfang, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 727 days.

(21) Appl. No.: 12/591,732

(22) Filed: Nov. 30, 2009

(65) Prior Publication Data

US 2011/0126935 A1 Jun. 2, 2011

(51) Int. Cl.
*B65D 59/06* (2006.01)

(52) U.S. Cl.
USPC .......................................... 138/96 R

(58) Field of Classification Search
USPC .......................................... 138/96 R
See application file for complete search history.

(56) References Cited

U.S. PATENT DOCUMENTS

| | | | |
|---|---|---|---|
| 1,903,220 A | 3/1933 | Lemert | |
| 1,912,312 A | 5/1933 | Schacht | |
| 3,379,327 A | 4/1968 | Link et al. | |
| 3,463,196 A | 8/1969 | Richardson | |
| 3,563,277 A | 2/1971 | Klipper | |
| 3,621,623 A | 11/1971 | Downes | |
| 3,677,434 A * | 7/1972 | Boyer | 220/324 |
| 3,780,773 A | 12/1973 | Haugen | |
| 3,856,050 A | 12/1974 | Rooney | |
| 3,942,681 A | 3/1976 | Richardson | |
| 3,996,966 A | 12/1976 | Princell | |
| 4,014,368 A | 3/1977 | Nelsen | |
| 4,094,436 A * | 6/1978 | Birmingham | 220/315 |
| 4,233,697 A | 11/1980 | Cornwall | |
| 4,423,753 A | 1/1984 | Smith et al. | |
| 4,799,716 A | 1/1989 | Kujawa et al. | |
| 4,915,137 A | 4/1990 | Hall et al. | |
| 5,265,752 A | 11/1993 | Olson | |
| 5,435,350 A | 7/1995 | Bowes | |
| 5,496,141 A | 3/1996 | Popsys | |
| 5,503,189 A | 4/1996 | Lamendola | |
| 5,546,989 A | 8/1996 | Bowes | |
| 5,622,208 A | 4/1997 | Vinson | |
| D412,970 S | 8/1999 | Whyte | |
| D430,652 S | 9/2000 | Toit et al. | |

(Continued)

FOREIGN PATENT DOCUMENTS

DE 78 19 986 10/1978

OTHER PUBLICATIONS

Caplugs Self-Adhesive Die Cut Flange Protectors Full Face http://www.caplugs.com/productdetails.aspx?id=1000015&itemno=FAF+SERIES sold since at least as early as 1990.

(Continued)

*Primary Examiner* — James Hook
(74) *Attorney, Agent, or Firm* — Hodgson Russ LLP

(57) ABSTRACT

A flange protector is provided comprising a flexible impact-resistant material having a cover portion, the cover portion having such dimension and configured to cover in protective relationship the surface of a flange member adapted to be connected to an opposing flange member, the flange protector having multiple lugs configured to be inserted into bolt holes located about the periphery of the flange. The lugs have an upper end attached to the flange protector and an insertable end spaced therefrom, the upper end being connected to the flange protector by hinge means, and the lower end being configured to permit rotation into and engagement with a bolt hole. A combination of the flange protector and a flange is also provided.

20 Claims, 9 Drawing Sheets

U.S. PATENT DOCUMENTS

| | | |
|---|---|---|
| 6,332,478 B1 | 12/2001 | Holden et al. |
| 6,532,992 B1 | 3/2003 | Holden |
| D475,925 S | 6/2003 | Sturk |
| 2008/0142108 A1 | 6/2008 | Baker et al. |
| 2010/0212765 A1 | 8/2010 | Baker et al. |
| 2012/0234430 A1* | 9/2012 | Zeyfang ...................... 138/96 R |

OTHER PUBLICATIONS

Caplugs die-cut flange protector with bolt holes http://www.caplugs.com/productdetails.aspx?id=1000015&itemno=FAN+SERIES sold since at lea at as early as 1970.

Caplugs Stud Hole Flange Protector http://www.caplugs.com/productdetails.aspx?id=1000015&itemno=FC+SERIES sold since at least as early as 1976.

Caplugs.Self-adnesive raised face flange protector http://www.caplugs.com/productdetails.aspx?id=1000015 &itemno=FAR+SERIES sold since at least as early as 1990.

Caplugs Valve Flange protectors http://www.caplugs.com/productdetails.aspx?id=1000015 &itemno=VALVE+FLANGE+SERIES since at least 1990.

Caplugs Push-in Flange Protectors http://www.caplugs.com/productdetails.aspx?id=1000015&itemno=EPN+305+SERIES sold at least as early as 1990.

Caplugs Outside Fitting Flange Protectors http://www.caplugs.com/productdetails.aspx?id=1000015 &itemno=EPN+310+SERIES+PIPE sold since at least as early as 1990.

Caplugs Vinyl American Standard Flange Protectors http://www.caplugs.com/productdetails.aspx?id=1000002 &itemno=VAS+SERIES sold since at least as early as 1990.

Caplugs Vinyl Flange Protectors http://www.caplugs.com/productdetails.aspx?id=10000078dtemno=VF+SERIES sold since at least as early as 1990.

Caplugs Vinyl Snap Ring Flange Covers http://www.caplugs.com/productdetails.aspx?id=1000002&itemno=VSR+SERIES sold since at least as early as 1990.

International Search Report and Written Opinion of Mar. 7, 2011 PCT /US2010/003055.

* cited by examiner

FLANGE PROTECTOR

BACKGROUND OF THE PRESENT INVENTION

The present invention is directed to a flange protector for use with a flange which may be used, for instance, for making connections to pipes, valves, etc. Such flanges have bolt holes adapted to receive bolts for making such connections to a mating flange having corresponding bolt holes.

A number of flange protector designs are known. See, for instance, U.S. Pat. Nos. 3,942,681; 4,014,368; 4,423,753; 4,915,137; 5,503,189; 5,435,350; 5,546,989; 6,332,478; and 6,532,992. A representative flange protector of the prior art is shown by FIG. 1, having cylindrical lugs extending downwardly from fixed tabs extending outwardly from the flange cover.

The flange surface will typically be finely machined to ensure a tight seal between the mating flange surfaces and an intervening sealing gasket that is compressed between the opposing flange surfaces when connected together with bolts via the bolt holes in the opposing flanges. It is a disadvantage for the flange surface to be damaged by way of scratches, nicks, etc., as this diminishes the effectiveness of the sealing by the gasket. The use of a flange protector during storage, shipment, etc. is thus found useful to protect the flange surface. A number of flange protector designs have accordingly been employed for this purpose.

While generally satisfactory, such designs are in need of improvement. For instance, it is at times difficult to install the flange protector, particularly when the flange protector has lugs which must be seated within bolt holes spaced about the periphery of a flange to be protected. Depending upon the flexibility of the flange protector body, it may be difficult to fittingly engage a number of lugs within multiple bolt holes at the same time since the lugs must be engaged within each hole.

It may also be difficult to remove the flange protector once installed on the flange, as the flange protector is maintained in place by the action of multiple lugs which are each snugly fit within a bolt hole. The removal of the lugs is made more difficult due to the fact that a number of lugs must be removed at the same time, as well as the fact that the lugs must each be lifted from the bolt holes in the direction of the longitudinal axis of the bolt holes in order to be removed. Such removal is also made difficult by the fact that the flange protector is relatively inflexible, since the material employed must be impact-resistant in order to provide adequate protection.

Additionally, it is difficult to maintain the true position of the lugs with respect to the longitudinal centerline of the flange bolt holes. This is due to variations in the dimensions of the flange protector due to variations in the injection molding processing, as well as wide variances in molded flange protector shrinkage (depending upon the material used, etc.). Warping of the flange protector also contributes to the lugs being out of alignment and/or position with respect to the bolt holes.

It is accordingly an object of the present invention to provide a flange protector suitable for protective engagement with the face of a flange having bolt holes therein, which flange protector may both be easily installed on the flange by use of such bolt holes, while ensuring proper alignment with the bolt holes, as well as easily removed yet reusable, while still providing satisfactory protection for the flange during storage and/or transport.

SUMMARY OF THE INVENTION

The present invention is directed to a reusable flange protector comprising a flexible impact-resistant material having a cover portion and flange bolt hole engaging portions.

The flange protector cover portion has such dimension and is configured to cover in protective relationship at least a portion of the surface of a flange member adapted to be connected to an opposing flange member. The flange protector has on at least a portion thereof multiple bolt-hole engageable lugs extending therefrom. The lugs have an upper end attached to the flange protector by pivot means and a lug body configured to fit into a bolt hole in the flange in locking engagement therewith. The lug body is rotatable from a position either into or out of engagement with a bolt hole in the flange to an opposite position in relation to the bolt hole.

In one embodiment, the lug has a lower end defined by an oblique surface slanted with respect to the plane of the cover portion of the flange protector, with the longitudinal length of the lug closest to the pivot means being greater than the longitudinal length of the lug opposite therefrom, whereby the lug may be rotated from an upward position into a lower position into a bolt hole in locking engagement therewith. The bottom of the lug may also be flat and parallel to the plane of the flange protector cover, while also having a longitudinal length short enough to be able to be rotated into and out of the bolt hole in the flange.

In another embodiment, there is provided in combination, the flange protector of the present invention and a flange having bolt holes therein, with the flange protector being in protective relationship with the surface of the flange having bolt holes therein. The flange protector has multiple lugs at least a portion of which are fittingly engaged in at least a portion of the bolt holes, the lugs having a lug body of such dimension and configured to fit within the bolt holes in the flange in a manner sufficient to maintain the flange protector in protective relationship with the flange.

DETAILED DESCRIPTION OF THE INVENTION

Figure 1:
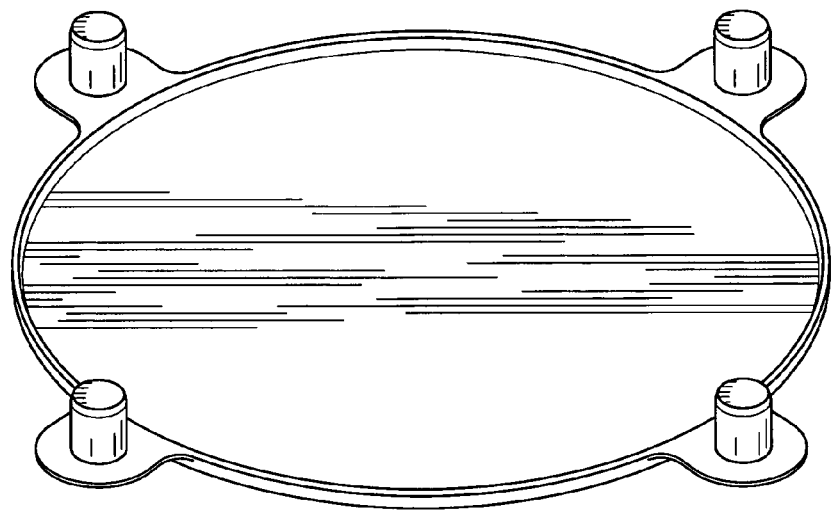
FIG. 1 is a view in perspective of a prior art flange protector having fixed tabs and lugs.

The flange protector of the present invention will be described in connection with FIGS. 2-14.

The flange protector 1 of the present invention comprises a planar cover 3 generally having the configuration of a flange surface 5 to be protected, and includes multiple lugs 7 extending from the flange protector, and configured to be seated within bolt holes in the flange to hold the flange protector in place. Generally, the cover portion of the flange protector will be circular in configuration, as this is generally the configuration of the flange surface to be protected. However, the flange protector may be of any configuration which provides the requisite protection for the surface of the flange 30.

The flange protector may be a full or partial face flange protector. A full face flange protector (FIGS. 10, 11) is intended to cover substantially the entire face of the flange, including the periphery extending outwardly from the bolt holes. A full face flange protector may, for instance, have tabs positioned within the periphery of the protector from which lugs extend and which engage adjacent bolt holes within the flange. A partial face flange protector (FIGS. 2-4, 8, 12) covers the portion of the flange face inside of the periphery of the bolt holes, while including lugs 7 or lateral tabs 9 pivotally attached to the periphery of the flange cover.

Lugs 7 extend from the tabs 9 so as to be able to be seated into adjacent bolt holes in the flange. In either embodiment, the flange protector is attached to the flange by insertion of lugs 7 into the bolt holes.

Figure 2:
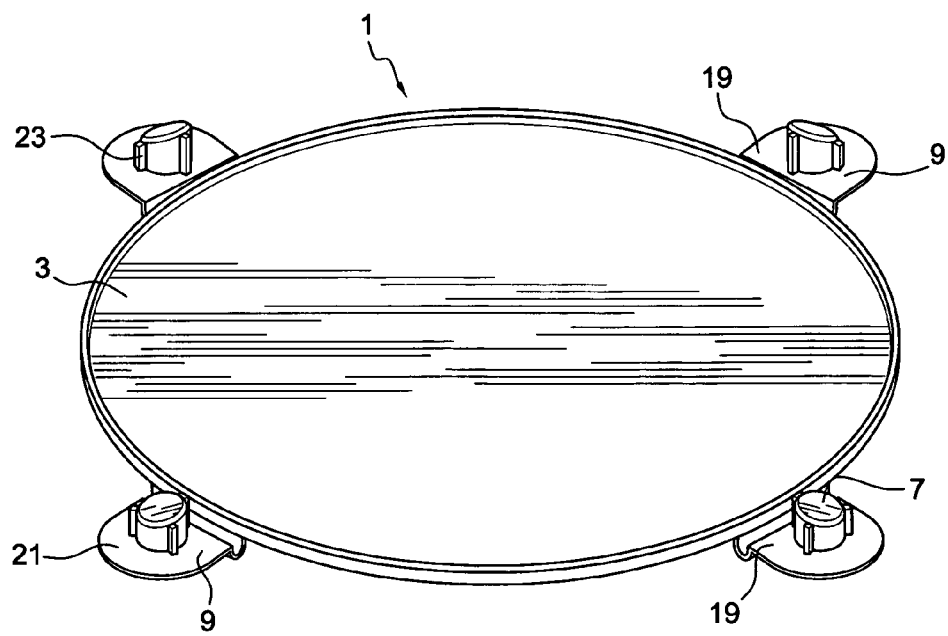
FIG. 2 is a view in perspective of an embodiment of the flange protector of the present invention as viewed from the bottom.
Figure 3:
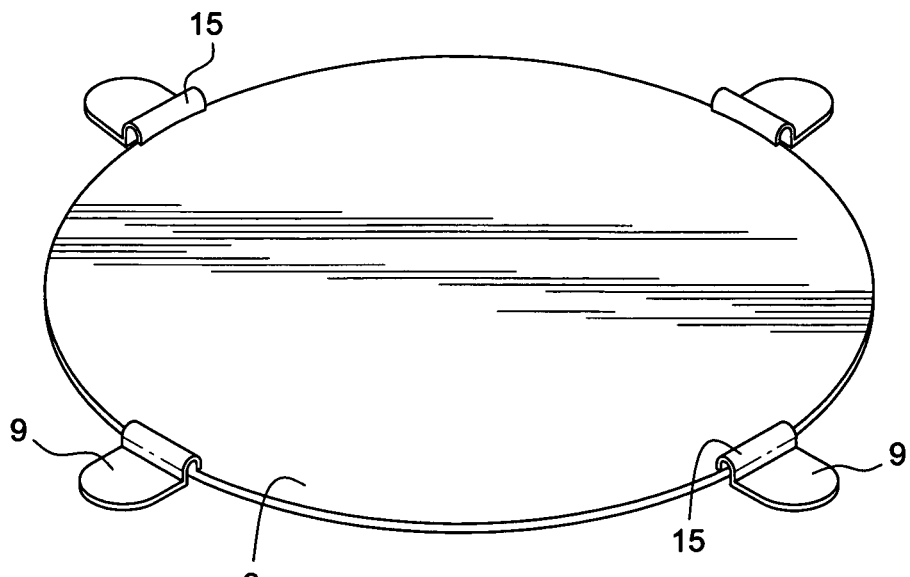
FIG. 3 is a top view of the flange protector of FIG. 2 having four lugs.
Figure 4:
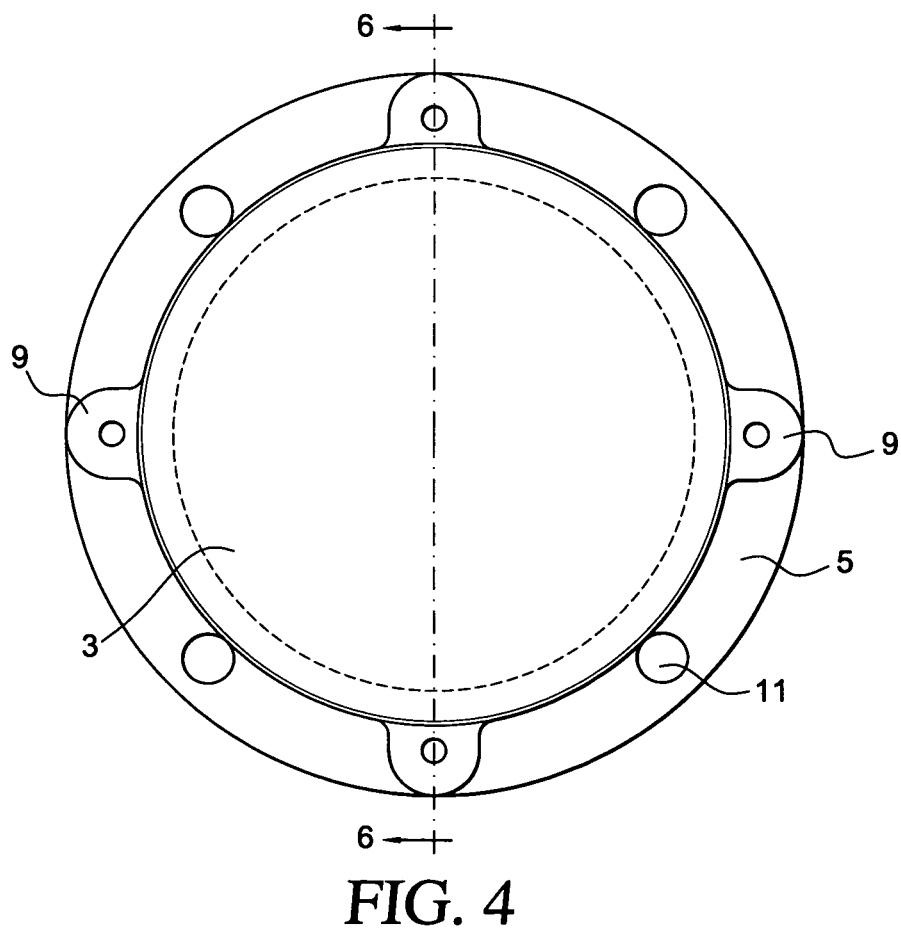
FIG. 4 is a view of the flange protector of FIG. 3 with the lugs of the flange protector inserted into bolt holes of a flange when viewed from the top of the flange protector.
Figure 5:
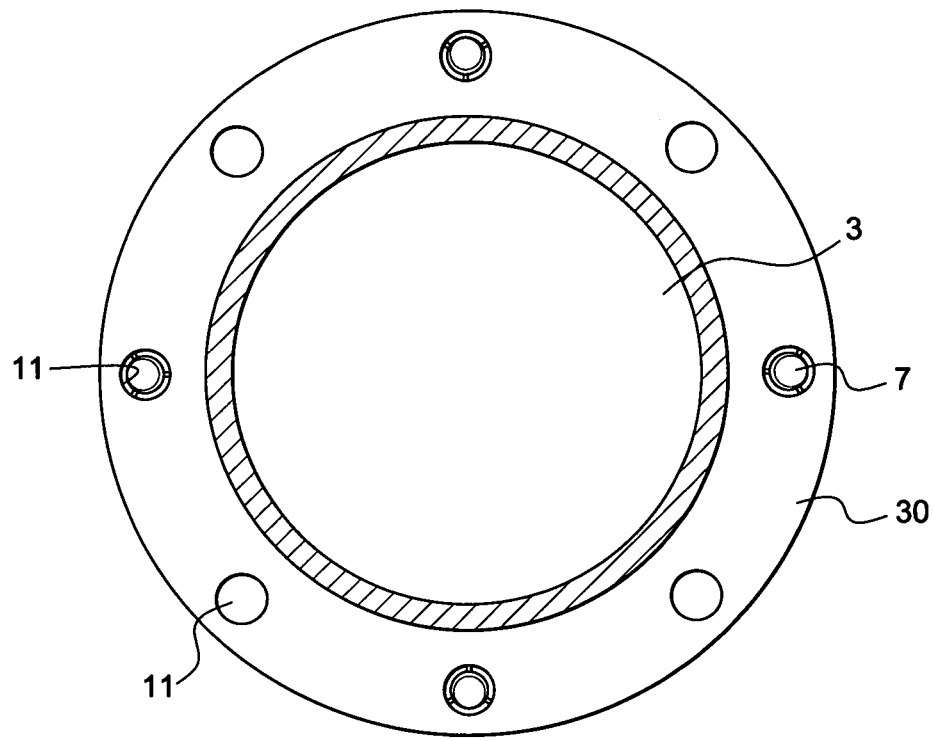
FIG. 5 is a view of the flange protector of FIG. 3 with the lugs of the flange protector inserted into bolt holes of the flange when viewed from the bottom of the flange.
Figure 6:
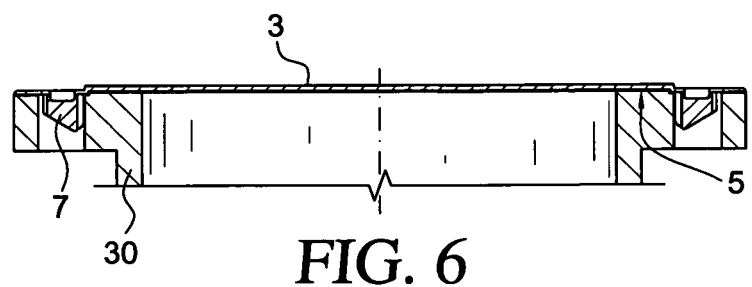
FIG. 6 is a cross-sectional view of the flange protector when in protective engagement with a flange as shown in FIGS. 4 and 5.
Figure 8:
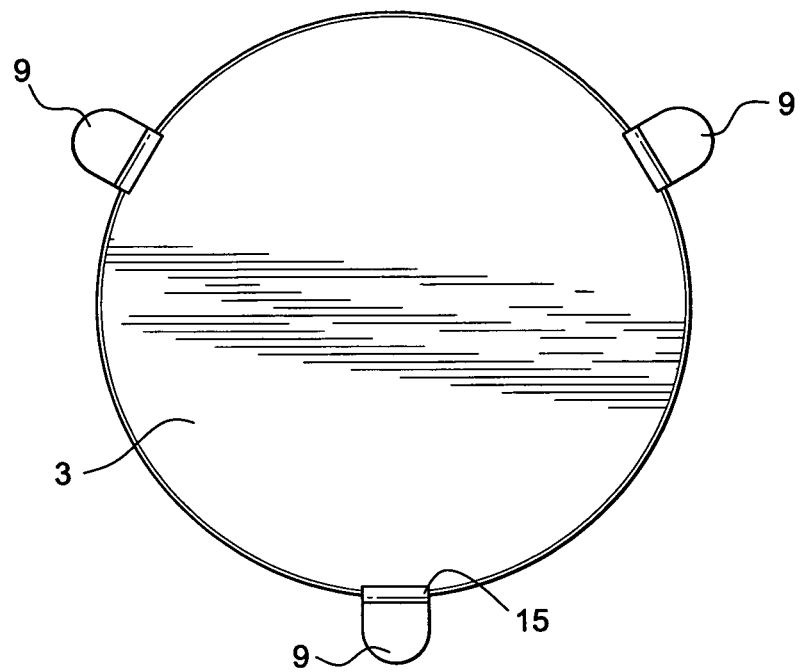
FIG. 8 is a top view of an alternative embodiment of the flange protector of the present invention having three tabs.
Figure 12:
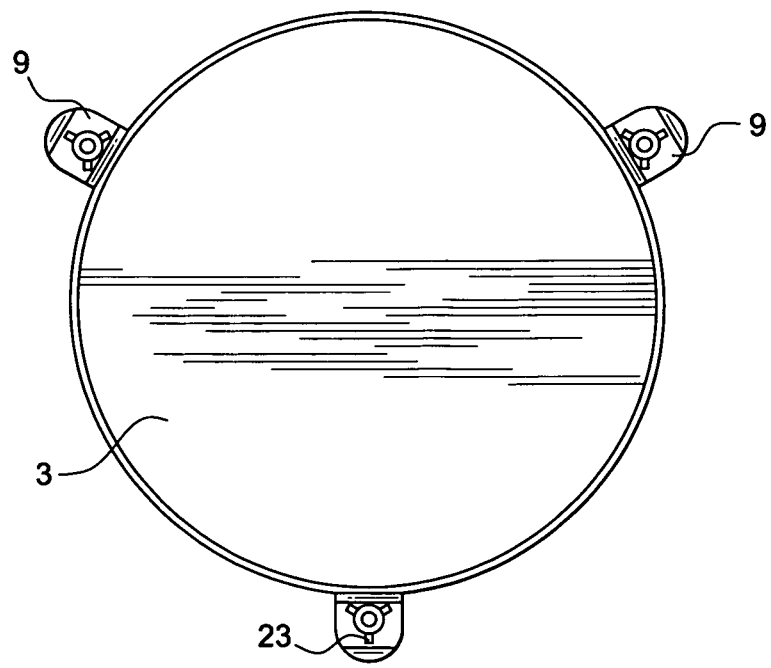
FIG. 12 is a bottom view of the embodiment of FIG. 8.
Figure 13:
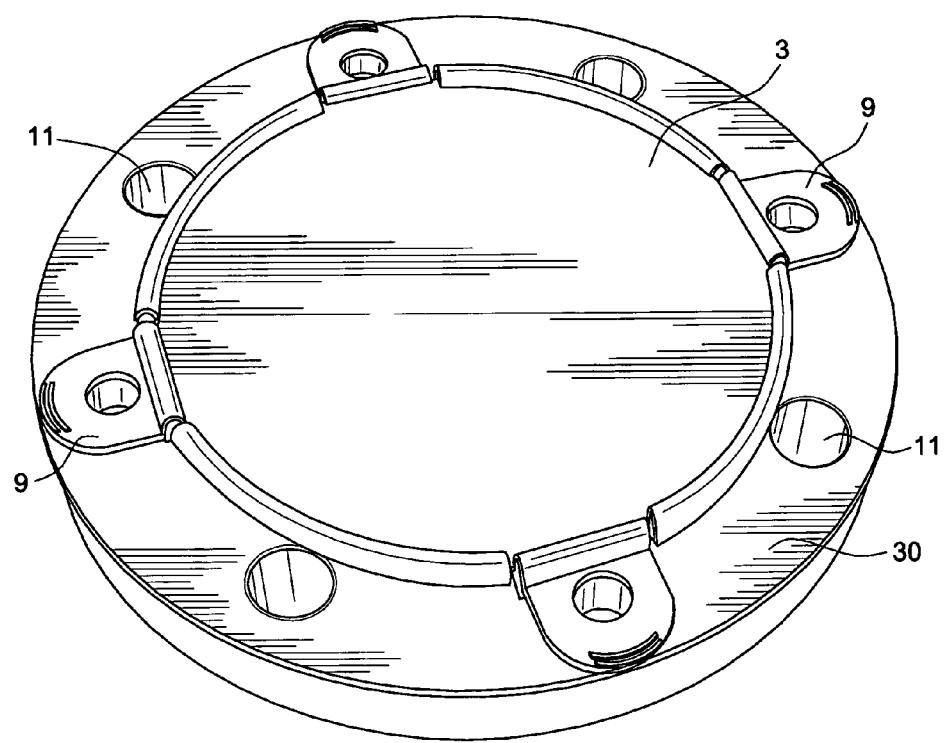
FIG. 13 is a top perspective view of another embodiment of the flange protector of the present invention in protective engagement with a flange surface.

Generally, the flange protector will include at least three lugs spaced about the periphery of the flange cover as shown in FIGS. 8 and 12 to provide adequate attachment of the flange protector to the flange. The flange protector, may also, of course, include four or more lugs 7 spaced about the periphery of the flange cover as shown in FIG. 2. The number of lugs which are present is immaterial as long as the flange cover is able to be sufficiently anchored or connected to the flange surface by engagement of the lugs within the bolt holes. Also, it is advantageous (but not necessary) for the lugs to be equally-spaced about the periphery of the flange cover as shown in the Figures. The position of the lugs preferably corresponds to and are in registration with the position of the bolt holes 11 placed about the periphery of the flange face (FIGS. 4 and 13).

However, as the lugs are hingedly connected to the flange protector, it is possible for the flange protector to include more lugs attached thereto than may be required to be fittingly engaged with corresponding bolt holes in the flange surface to maintain the flange protector in protective relationship to the flange. That is, a flange protector having, for instance, six hinged lugs attached thereto may only require the use of four lugs to attach the flange protector to the flange, particularly if not all lugs are positioned so as to fit in a corresponding bolt hole. In such instance, the unused two lugs would remain in position rotated upwarded from the flange in a non-inserted position. However, it is preferred that all lugs be inserted into corresponding bolt holes in the flange surface. Correspondingly, it is possible that the flange may have more bolt holes than the number of lugs on the flange protector. The flange protector of the present invention may nonetheless still be used with advantage.

Figure 7A:
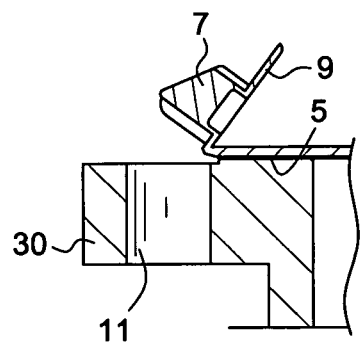
FIGS. 7A, 7B, 7C and 7D depict the manner of insertion of the lug of the flange protector of the present invention in a bolt hole of a flange to be protected.
Figure 7B:
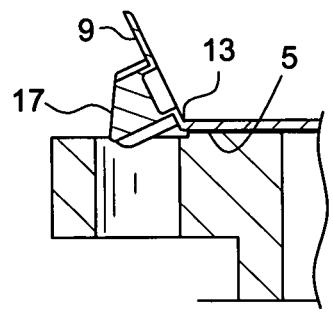
Figure 7C:
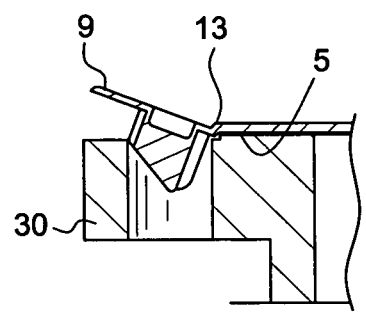
Figure 7D:
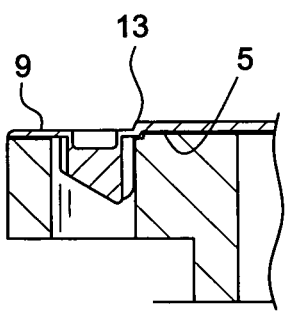

Each of the tabs 9 includes on a bottom surface thereof a lug 7 extending therefrom. The tab (or lug) is pivotally connected to the flange cover to permit the tab and attached lug to move from a laterally-extending bolt-hole insertion position (FIG. 7D) to an upwardly-extending pre-insertion or removal position (FIG. 7A), by means of intermediate rotational positions (FIGS. 7B and 7C).

The lugs are preferably pivotally connected to the flange cover by means of a living hinge therebetween. Advantageously, the "living hinge" as depicted in the Figures not only provides the requisite pivotal connection, but has the ability to adjust (such as by flexing) to conform to various bolt hole positional variations that may exist. This allows each lug to exhibit a range of positional fittings in relation to the bolt holes, to overcome any variances resulting from shrinkage/warping of the flange protector such as might occur as a result of the molding process. This is a significant advantage over prior art flange protectors whose lug portions are inflexible at the joint between the tabs/lugs and the flange cover portion of the flange protector.

The lug may be pivotally connected to the flange cover by any suitable means. For instance, as shown in FIG. 7, hinge means may be formed as a weakened (thinner) molded portion 13 at the junction of the lug and the flange cover. The presence of the weakened or thinner portion permits the rotation of the lug upwardly toward the top surface of the flange cover, as well as downwardly to a bolt hole insertion position. Alternatively, the lug may be connected to the flange cover by a molded hinge strap 15 that connects the two members (FIGS. 3, 9A and 9B) which enables the same type of movement. The manner by which such connection is accomplished is not critical to practice of the present invention, as long as the requisite rotation of the lug is permitted to occur. In the full cover embodiment, the lug may also rotate to either side if the hinge is so positioned, instead of rotating toward the center of the flange cover as depicted.

Each lug body 7 has an upper end attached to the tab 9, and a lower end spaced from the upper end which becomes seated within the bolt hole. The lug body is configured and has such dimensions so as to be able to rotate into and out of the bolt hole, as well as to be snugly fitted within the hole to hold the flange protector into position.

In one embodiment, the lower end of the lug is truncated and defined by an oblique surface 17 (FIGS. 7, 11) slanted with respect to a plane which extends through the flange protector surface. In this instance, the longitudinal length of the lug closest to the pivot means is greater than the longitudinal length of the lug opposite therefrom in order to form the oblique surface. The oblique surface permits the lug to pivot into the bolt hole for engagement therewith as shown in FIGS. 7A-7D. The oblique surface may be planar in configuration (as shown), as well as more curved in a side-to-side direction. As a result of the lug configuration, the lug will extend only partially into the length of the bolt hole 11.

Figure 9A:
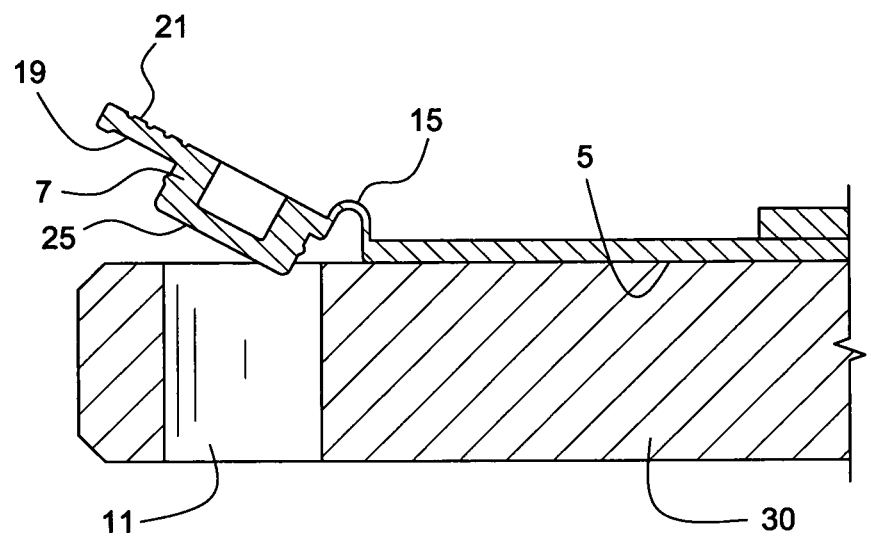
FIGS. 9A and 9B are cross-sectional views of an alternative embodiment of the pivot means used to connect a tab to the flange cover.
Figure 9B:
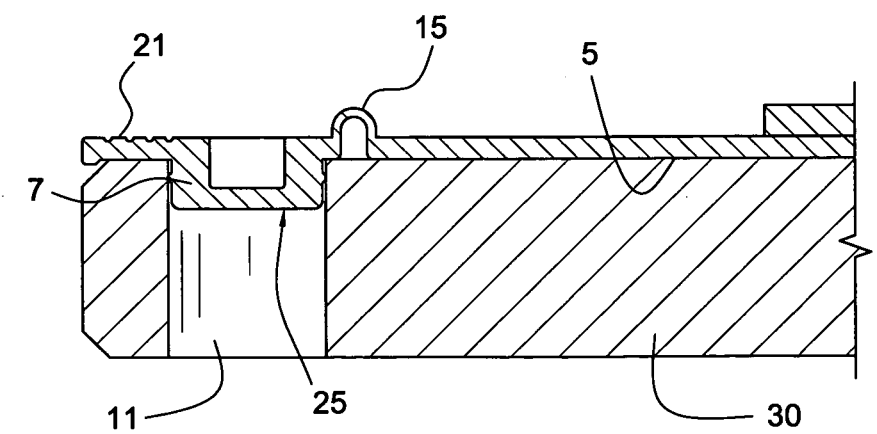
Figure 10:
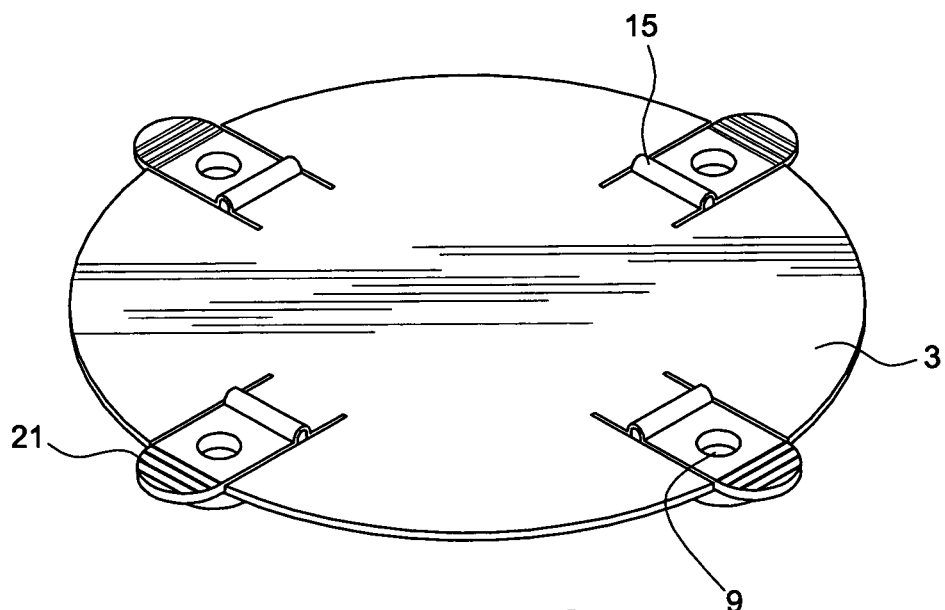
FIG. 10 is a view in perspective of another embodiment of the present invention viewed from the top showing the tabs in the closed position.
Figure 11:
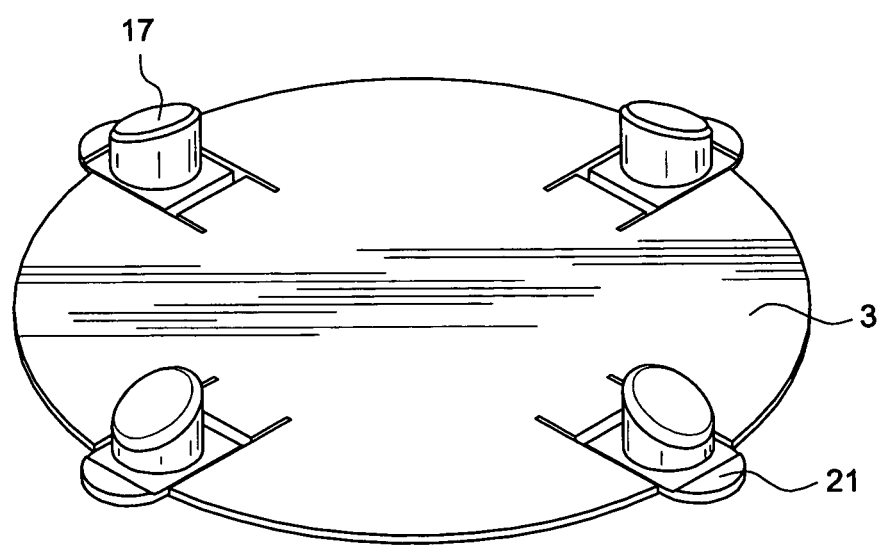
FIG. 11 is a view from the bottom of the embodiment of FIG. 10 showing the tabs in closed position.

FIGS. 9A and 9B depict an alternative embodiment where the bottom surface 25 of the lug is planar and parallel to the plane of the surface of the flange protector. In such an instance, the longitudinal length of the lug will be short enough such that the lug is able to pivot into the bolt hole 11 for engagement therewith.

Since the bolt holes generally have a cylindrical interior configuration, the lugs will generally have a corresponding configuration to permit the requisite locking engagement. As a result, the lug will preferably be circular in cross-sectional configuration if the bolt hole is similarly configured. However, the configuration of the lug need only be such as to permit sufficient engagement with the interior of the bolt hole to maintain the flange protector in place in protective relationship to the surface of the flange. For instance, the lug may be triangular in cross-sectional configuration, with the lug having three point engagement with the bolt hole.

The tab to which the lug may be attached will generally include laterally-extending shoulder portions 19 (FIG. 9) which seat against the top surface of the flange protector when the lug is inserted into the bolt hole. This ensures that the hole is sealed from above, as well as serving as a stop upon insertion of the lug into the bolt hole and a finger tab for gripping the tab.

The tabs to which the lugs may be attached may be of any suitable configuration. For instance, in FIG. 4, the tabs are shown as being substantially semi-circular in configuration at their ends, with the lug centered within the tab. Such a configuration preferably includes an extension 21 (FIG. 10) at the end of the tab which assists in removal of the lug from engagement with the bolt hole by moving the tab upwardly. Of course, the tab may be rectangular in configuration, more elongated, or wider.

To assist in maintaining a snug fit of the lug body within the bolt hole, the lug may include annular or longitudinal ridges, ribs, or outward extensions 23 (FIGS. 12 and 14) which serve to engage the interior of the bolt hole once the lug is inserted therein. Such ridges or extensions may extend either partially or entirely laterally around or longitudinally along the body of the lug. The particular design of such ridges, ribs or extensions is not critical to practice of the invention, with it only being desirable for the design which is employed to snugly engage the inner walls of the bolt hole to assist in maintaining the lug in engagement with the hole once inserted in the hole.

The lugs may be solid or have a hollowed interior. If the lug has a hollowed interior (FIGS. 9, 10), the lug will preferably have either a closed bottom or a closed top. Of course, as depicted in FIGS. 13 and 14, the lug may be both hollow and open at each end.

Figure 14:
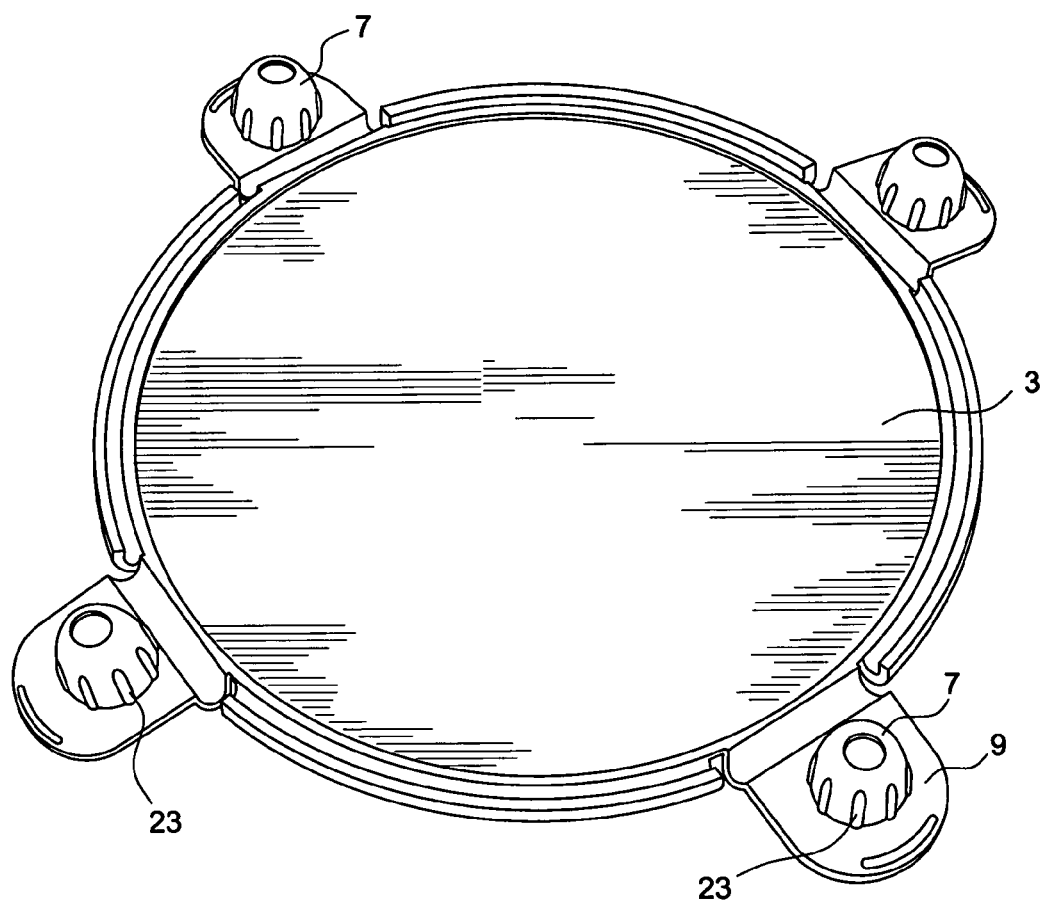
FIG. 14 is a bottom view of the flange protector of FIG. 13 upon being removed from the flange to be protected.

FIGS. 13 and 14 depict an embodiment of the flange protector wherein the periphery of the flange protector includes a molded-in circumferential grooved portion which serves to inhibit the tendency of the flange protector to warp during use. This enhances the ability of the lugs to be seated within the bolt holes.

In order to provide the requisite protection for the flange, the flange protector is comprised of a conventional impact resistant molding material such as polyethylene, polypropylene, polystyrene, etc. The particular molding material employed is not critical to practice of the claimed invention, as long as the material enables the desired protection of the flange surface to be achieved. The flange protector may be formed by any suitable plastic processing method used with such materials, such as injection molding, compression molding, vacuum forming, etc. One of ordinary skill in the art can readily form the flange protector of the present invention using such methods using appropriate materials and processing conditions.

While the invention has been described in connection with what are presently considered to be the most desirable and appropriate embodiments, it is understood that the invention is not limited to the disclosed embodiments, but is also intended to cover within the scope and spirit of the appended claims various modifications and equivalents thereof.

What is claimed is:

1. A flange protector comprising a flexible impact-resistant material having a cover portion, said cover portion having such dimension and configured to cover in protective relationship the sealing surface of a flange member adapted to be connected to the sealing surface of an opposing flange member and said flange members having bolt holes therein, said flange protector having multiple lugs spaced about a periphery of said cover portion, each said lugs having a lug body having an upper end attached to a portion of said periphery of said cover portion and a lower end spaced from said upper end and insertable into a bolt hole, and said upper end of said lug body connected to said portion of said periphery of said cover portion by a living hinge whereby said lug body is rotatable about said portion of said periphery of said cover portion from a position either into or out of engagement with said bolt hole in said flange, to an opposite position in relation to said bolt hole.

2. The flange protector of claim 1, wherein said lugs depend from tabs which are attached to said portion of said periphery of said cover portion by said living hinge.

3. The flange protector of claim 1, comprising at least three lugs.

4. The flange protector of claim 1, comprising at least four lugs.

5. The flange protector of claim 1, wherein said flange protector is comprised of polyethylene, polypropylene, or polystyrene.

6. The flange protector of claim 1, wherein said lugs depend from tabs which are attached to said portion of said periphery of said cover by said molded hinge strap.

7. The flange protector of claim 1, comprising at least three lugs.

8. The flange protector of claim 1, comprising at least four lugs.

9. The flange protector of claim 1, wherein said flange protector is comprised of polyethylene, polypropylene, or polystyrene.

10. In combination, a flange protector and a flange having bolt holes therein, said flange protector comprising a flexible impact-resistant material having a cover portion, said cover portion having such dimension and configured to cover in protective relationship the sealing surface of said flange, said flange protector having multiple lugs spaced about a periphery of said cover portion, at least a portion of said lugs are fittingly engaged in at least a portion of said bolt holes, each said lugs having a lug body having an upper end attached to a portion of said periphery of said cover portion and a lower end spaced from said upper end, and said upper end of said lug body connected to said portion of periphery of said cover portion by a living hinge whereby said lug body is rotatable about said portion of said periphery of said cover portion from a position either into or out of engagement with a bolt hole in said flange to an opposite position in relation to said bolt hole, and said lugs having a lug body of such dimension and configured to fit within said bolt holes in said flange in a manner sufficient to maintain said flange protector in protective relationship with said flange.

11. The combination of claim 10, wherein said lugs depend from tabs which are attached to said portion of said periphery of said cover portion by said living hinge.

12. The combination of claim 10, comprising at least three lugs.

13. The combination of claim 10, comprising at least four lugs.

14. The combination of claim 10, wherein said flange protector is comprised of polyethylene, polypropylene, or polystyrene.

15. The combination of claim 10, wherein said lugs depend from tabs which are attached to said portion of said periphery of said cover portion by said molded hinge strap.

16. The combination of claim 10, comprising at least three lugs.

17. The combination of claim 10, comprising at least four lugs.

18. The combination of claim 10, wherein said flange protector is comprised of polyethylene, polypropylene, or polystyrene.

19. A flange protector comprising a flexible impact-resistant material having a cover portion, said cover portion having such dimension and configured to cover in protective relationship the sealing surface of a flange member adapted to be connected to the sealing surface of an opposing flange member and said flange members having bolt holes therein, said flange protector having multiple lugs spaced about a periphery of said cover portion, each said lugs having a lug body having an upper end attached to a portion of said periphery of said cover portion and a lower end spaced from said upper end and insertable into a bolt hole, and said upper end of said lug body connected to said portion of said periphery of said cover portion by a molded hinge strap whereby said lug body is rotatable about said portion of said periphery of said cover portion from a position either into or out of engagement with said bolt hole in said flange, to an opposite position in relation to said bolt hole.

20. In combination, a flange protector and a flange having bolt holes therein, said flange protector comprising a flexible impact-resistant material having a cover portion, said cover portion having such dimension and configured to cover in protective relationship the sealing surface of said flange, said flange protector having multiple lugs spaced about a periphery of said cover portion, at least a portion of said lugs are fittingly engaged in at least a portion of said bolt holes, each said lugs having a lug body having an upper end attached to a portion of said periphery of said cover portion and a lower end spaced from said upper end, and said upper end of said lug body connected to said portion of periphery of said cover portion by a molded hinge strap whereby said lug body is rotatable about said portion of said periphery of said cover portion from a position either into or out of engagement with a bolt hole in said flange to an opposite position in relation to said bolt hole, and said lugs having a lug body of such dimension and configured to fit within said bolt holes in said flange in a manner sufficient to maintain said flange protector in protective relationship with said flange.

\* \* \* \* \*